United States Patent
Ressayre et al.

(10) Patent No.: US 9,102,295 B2
(45) Date of Patent: Aug. 11, 2015

(54) METHOD AND SYSTEM FOR MONITORING A RENTAL VEHICLE

(75) Inventors: Sandrine Ressayre, Auffargis (FR); Franck Thieulent, Saint Ouen (FR)

(73) Assignee: Bluecarsharing, Puteaux (FR)

( * ) Notice: Subject to any disclaimer, the term of this patent is extended or adjusted under 35 U.S.C. 154(b) by 0 days.

(21) Appl. No.: 14/129,347

(22) PCT Filed: Jul. 2, 2012

(86) PCT No.: PCT/FR2012/051528
§ 371 (c)(1),
(2), (4) Date: Mar. 14, 2014

(87) PCT Pub. No.: WO2013/001256
PCT Pub. Date: Jan. 3, 2013

(65) Prior Publication Data
US 2014/0249751 A1    Sep. 4, 2014

(30) Foreign Application Priority Data
Jun. 30, 2011   (FR) .................................. 11 02066

(51) Int. Cl.
*B60R 25/102* (2013.01)
*G08B 13/14* (2006.01)
*G08B 21/02* (2006.01)
*G06Q 10/06* (2012.01)
*G06Q 30/06* (2012.01)

(52) U.S. Cl.
CPC .............. *B60R 25/102* (2013.01); *G06Q 10/06* (2013.01); *G06Q 30/0645* (2013.01); *G08B 13/1427* (2013.01); *G08B 21/0213* (2013.01); *G08B 21/0269* (2013.01)

(58) Field of Classification Search
CPC ............. B60R 25/102; G08B 13/1427; G08B 21/0213; G08B 21/0269; G06Q 10/06; G06Q 30/0645
USPC .............. 701/31.4, 32.4, 32.5, 516, 517, 468, 701/519; 340/426.1, 426.18, 426.19
See application file for complete search history.

(56) References Cited

U.S. PATENT DOCUMENTS 7,031,835 B2 *   4/2006   Flick ............................. 701/517
7,398,153 B2 *   7/2008   Workman et al. ............. 701/517
7,430,471 B2 *   9/2008   Simon .......................... 701/468

(Continued)

FOREIGN PATENT DOCUMENTS

EP         1724168 A1    11/2006
WO    2005095167 A1    10/2005

OTHER PUBLICATIONS

European Patent Office; Search Report in International Patent Application No. PCT/FR2012/051528 dated Sep. 6, 2012; 6 pages.

(Continued)

*Primary Examiner* — Richard Camby
(74) *Attorney, Agent, or Firm* — Wood, Herron & Evans, LLP

(57) ABSTRACT

The invention relates to a method (400) for monitoring a rental vehicle, said vehicle including a navigation/geolocation device arranged such as to determine and report the positioning coordinates of said vehicle, said method including the following steps: verifying (406) that the positioning coordinates of said vehicle are inside a previously recorded predetermined area and, if the positioning coordinates are not inside the predetermined area, executing a step (408-440) of indicating the anomaly. The invention also relates to a system implementing such a method.

24 Claims, 3 Drawing Sheets

(56) References Cited

U.S. PATENT DOCUMENTS

2004/0093291 A1 5/2004 Bodin
2006/0111822 A1 5/2006 Simon
2009/0146846 A1 6/2009 Grossman

OTHER PUBLICATIONS

French Patent Office; Search Report in French Patent Application No. 1102066 dated Feb. 9, 2012; 2 pages.

* cited by examiner

METHOD AND SYSTEM FOR MONITORING A RENTAL VEHICLE

The present invention relates to a method for monitoring a vehicle available for rental. It also relates to a system implementing such a method.

The field of the invention is the field of monitoring vehicles available for rental and more particularly electric vehicles. More particularly, the invention relates to the field of monitoring vehicles available for rental over a determined zone comprising a plurality of rental sites.

BACKGROUND

Vehicles that operate with one or more electric batteries, and sites called rental sites allowing the collection of a rental vehicle or the return of a rented vehicle at the end of rental, are currently known.

These sites generally comprise a charging terminal used to charge the batteries of the rented vehicle while the vehicle is parked.

The vehicle rental stations and/or charging stations can be located and concentrated in a single geographical zone, called rental zone. This feature poses the problem of monitoring and locating the electric vehicles during the rental period in order to prevent a vehicle being situated outside the rental zone and being unable to return to the rental zone in order to reach a rental and/or charging site before the battery or batteries of the vehicle are completely discharged.

Moreover, the fact that a vehicle is situated outside the rental zone can be a sign of fraudulent use of the vehicle such as theft of the vehicle. No automated monitoring method and system making it possible to respond to this concern exist.

A purpose of the invention is to overcome the abovementioned drawbacks.

Another purpose of the invention is to propose a method and a system for monitoring an electric vehicle making it possible to ensure that, during the rental period, a vehicle is not situated outside the rental zone with its battery or batteries discharged.

Yet another purpose of the invention is to propose a method and a system for monitoring an electric vehicle available for rental making it possible to detect a fraudulent use of the vehicle for the purpose of theft of the vehicle.

SUMMARY OF THE INVENTION

The invention proposes to achieve at least one of the abovementioned purposes through a method for monitoring a vehicle available for rental, said vehicle comprising a global positioning/navigation device arranged to determine and notify the location coordinates of said vehicle, said method comprising the following steps:
  verifying that the location coordinates of said vehicle are situated in a previously registered predetermined zone, and
  if the location coordinates are not situated in the predetermined zone, executing an anomaly signalling step.

Thus, the method according to the invention makes it possible to carry out effective monitoring of a vehicle available for rental, primarily to ensure that, during the rental period, the vehicle is not situated outside the rental zone with its battery or batteries discharged. Thus, the method according to the invention makes it possible to ensure that the vehicle can reach a charging station during each rental period.

Moreover, the method according to the invention makes it possible to carry out monitoring of a vehicle during the rental period making it possible to detect an intention to use the vehicle fraudulently, or a fraudulent use of the vehicle, for example with a view to theft of the vehicle.

Optionally, the verification step can be carried out by a remote site, called the "central site", said method also comprising a step of transmitting the location coordinates of the vehicle to said central site.

The verification step can also be carried out by the vehicle. The latter then preferably transmits the result of the verification step to the central site, optionally and preferably with its location coordinates.

The method can also transmit to the central site, irrespective of the element carrying out the verification step, data relating to an identifier of the vehicle and/or an identifier of a user using the vehicle.

According to a particular embodiment, the verification step can be carried out only if the vehicle is moving.

The transmission and/or verification steps can be carried out at a predetermined frequency or at a predetermined distance travelled by the vehicle.

The transmission step and/or the verification step can be carried out only or additionally at the request of the central site, an operator, or the user.

The method according to the invention can also comprise a step of verifying data relating to the course and/or destination of the vehicle.

The course/destination data can then be verified by the central site or the vehicle, at least when the vehicle is outside the predetermined zone.

Particular measures to be carried out can be taken if the course of the vehicle is such that the vehicle is returning towards the predetermined zone. Such particular measures can comprise stopping the previously triggered signalling, or agreeing an extension period before the application of an alarm or a sanction.

Advantageously, the signalling step can comprise a step of displaying a warning on a user interface of the vehicle, such as an audible or visible warning.

The signalling step can comprise a step of transmitting a call to the vehicle, over the GPRS network by means of which the vehicle and the central site can communicate.

The signalling step can also comprise the sending of a message such as an SMS message to the user or the law enforcement agencies.

Such a message-sending step can in particular allow the user who is supposed to be using the vehicle to be warned if it is not he who is in the car, and thus directly warn the rental service or the law enforcement agencies or identify himself to an operator or law enforcement agencies wishing to verify that he is authorized to rent the vehicle.

The signalling step is preferably triggered or initiated by the central site.

The method according to the invention can comprise, before the signalling step, a step, called an additional test, testing an additional condition that must be met in order to trigger the alarm.

Such an additional precondition for a signalling step can comprise the vehicle being moved more than a predetermined distance from the predetermined zone, for example before emitting a signal by calling the vehicle or sending the SMS to the user.

Such an additional precondition for a signalling step can comprise the non-response of the user to a call from the central site (more particularly the call centre) to the vehicle during a predetermined period, for example before sending an SMS to the law enforcement agencies.

Different additional conditions make it possible to determine several signalling levels in order to adapt the signalling to different situations and avoid carrying out signalling for an erroneous detection caused by a malfunction of a component of the system implementing such a method, or a component of the vehicle or simply the communication network.

The method according to the invention can also comprise a step of sending, from the central site, an item of data triggering the modification of the operation of the vehicle, preferably the immobilization thereof.

Such a step can for example comprise the sending of an item of data relating to the starting of the vehicle, triggering a vehicle immobilization signal. The vehicle will thus be immobilized once the user has switched off the engine.

Such an item of data can subsequently be rectified by the manual sending, by an operator of the service, of a message with an item of data for starting, for example in the event that the user has correctly identified himself to the rental service after immobilization of the vehicle and undertakes to return to the predetermined zone.

According to another aspect of the invention, a system for monitoring a vehicle available for rental is proposed, said vehicle comprising a global positioning/navigation device arranged to determine and notify the location coordinates of said vehicle, said system comprising:

- at least one means of verifying that the location coordinates of said vehicle are situated in a previously registered predetermined zone, and
- at least one means of executing an anomaly signalling step if the location coordinates are not situated in the predetermined zone.

The invention applies particularly to the management of a fleet of interchangeable electric vehicles available for rental and for which a plurality of rental stations is provided.

BRIEF DESCRIPTION OF THE FIGURES

Other advantages and characteristics will become apparent on examination of the detailed description of embodiments which are in no way limitative, and the attached drawings in which.

DETAILED DESCRIPTION

It is understood that the embodiments which will be described below are in no way limitative. It is possible in particular to envisage variants of the invention comprising only a selection of features described below, separately from the other features described, if this selection of features is sufficient to confer a technical advantage or to differentiate the invention from the state of the prior art. This selection comprises at least one preferably functional feature without structural details, or with only some of the structural details if this part alone is sufficient to confer a technical advantage or to differentiate the invention from the state of the prior art.

In particular all the variants and embodiments described can be combined with each other if there is no technical objection to this combination.

Figure 1:
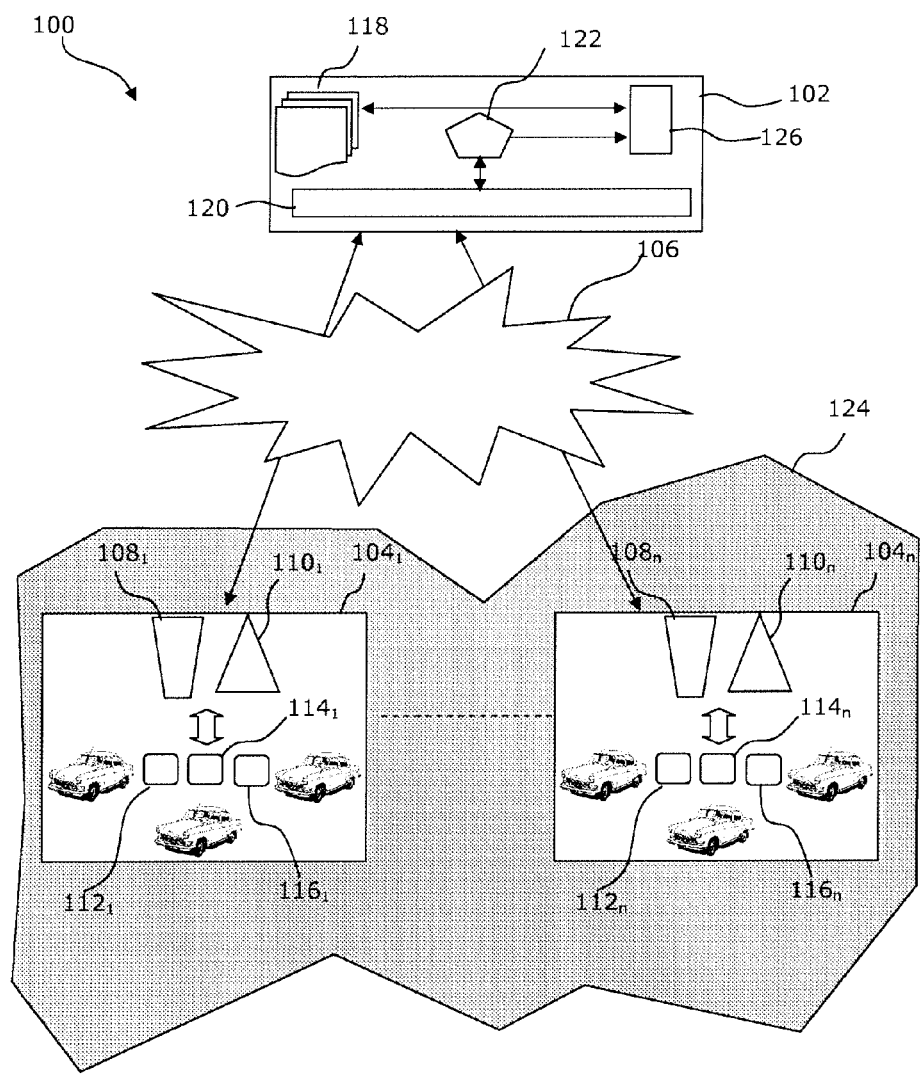
FIG. 1 is a diagrammatic representation of a management system for a fleet of vehicles available for rental in which the invention can be implemented.

FIG. 1 is a diagram of an overall management system of a fleet of electric vehicles available for rental.

The system 100 shown in FIG. 1 comprises a central site 102 (also called central agency in the remainder of the description) connected to several sites—or stations—$104_1$-$104_n$, called rental sites, by means of a wireless communication network 106, for example GPRS, or a wired network, for example of DSL type. Preferably, each station is connected to the central site via two separate networks, which enables continuous connection even if one of the networks fails.

Each rental station comprises a subscription terminal 108 for registering a new subscriber, a rental terminal 110 for the rental of a vehicle and several charging terminals 112-116, each charging terminal being provided for charging a vehicle equipped with an electric battery at a parking space.

The central site 102 can be connected directly to each of the terminals of a rental station 104 by means of the network 106 or solely to the subscription terminal and/or the rental terminal and/or the charging terminals 112-116.

At least two terminals of a rental station are connected to each other by means of a wired connection (not shown).

The central site 102 is also arranged to be connected to an electric vehicle comprising a data connector to one or more elements of the vehicle and/or a user communication interface, via a GPRS network. Each vehicle is for that reason equipped with a GSM chip.

The central site 102 is also arranged to exchange information with a portable communication device such as a PDA, a mobile phone, etc., carried by an operator of the rental service and also linked to the central site by means of a GPRS network.

The system makes it possible to manage a plurality of vehicles each comprising a control unit capable of communicating with the central agency and with different elements of the vehicle, and a user interface.

The users are capable of interacting with the different terminals as well as with the different elements of the vehicles. Moreover, the vehicle rental service with the system according to the invention can also be carried out with the help of the operators and their mobile terminal such as a PDA, who can intervene in the service.

The central site 102 also comprises a database 118 in which the user identifiers are saved in association with the identifiers of the vehicles used by these users.

The database 118 is updated at each new rental or at each end of rental.

The central site 102 also comprises a module for communicating 120 with one or more vehicles over the network 106 directly or indirectly via a terminal.

The central site 102 can also comprise a module 122 for analysing location data received from the vehicle via the communication network 106 to determine the position of the vehicle relative to a previously notified predetermined zone 124 and to detect an anomaly as a function of predetermined criteria, for example to determine whether the vehicle is situated in the predetermined zone, whether the vehicle is situated outside the predetermined zone at a distance less than a predetermined distance or whether the vehicle is situated outside the predetermined zone at a distance greater than a predetermined distance, etc.

Depending on the analysis carried out and if an anomaly is detected, the analysis module 122 can warn a module 126 for the management/transmission of signalling data and/or of warnings which can comprise messages, for example SMS, transmitted to an operator or to the law enforcement agencies over a wireless communication network, such as the GPRS network 106, or a wired network such as the ADSL network, or data transmitted to the vehicle and aimed at limiting or preventing the operation of the vehicle such as an ESA item of data corresponding to an item of data authorizing the starting of a vehicle.

The elements of a system for monitoring a vehicle according to the invention will now be described with reference to FIG. 2.

Figure 2:
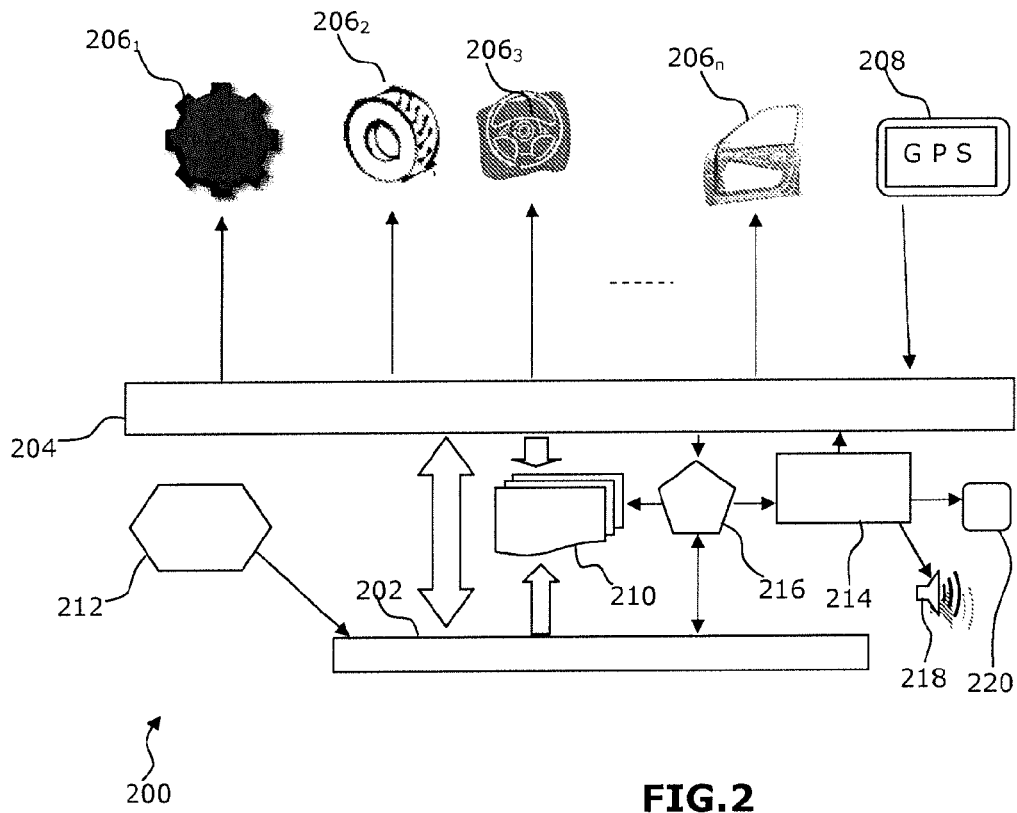
FIG. 2 is a diagrammatic representation of a system according to the invention.

The system 200 shown in FIG. 2 comprises a communication module 202 allowing the vehicle to communicate with the central site directly, in particular using a GPRS network, or by means of a charging, rental or subscription terminal.

The system 200 also comprises a control module 204 making it possible to control at least one element or component 206 for example an engine $206_1$, a wheel $206_2$, a steering wheel $206_3$ or a $206_n$ of the vehicle (not shown) and making it possible to prevent/limit the operation of this element as a function of data received from the control module 204 as a function of data received from the central site.

The system 200 also comprises at least one global positioning means 208 communicating the position of the vehicle, for example global positioning coordinates, to the control module 204.

The system 200 also comprises means 210 for storing data in the vehicle, for example an item of data identifying the user who has rented the vehicle and/or an item of data relating to the operation of an element 206.

The system also comprises a means 212 of identification of a user by reading an RFID or biometric identifier. When the identification module 212 is arranged in the vehicle, it communicates with the communication module 202.

The system 200 also comprises a module 214 for managing/transmitting warning data to the user or to the central site directly over a telecommunications network or by means of the communication module 202.

The system also comprises an analysis module 216 equipping the vehicle, arranged to receive the global positioning data of the vehicle and compare them with data relating to a predetermined zone to detect an anomaly as a function of predetermined criteria, for example to determine whether the vehicle is situated in the predetermined zone, whether the vehicle is situated outside the predetermined zone at a distance less than a predetermined distance, or whether the vehicle is situated outside the predetermined zone at a distance greater than a predetermined distance, etc. In order to carry out this analysis, the analysis module 216 can also ask the central site for at least one item of data by means of the communication module.

The system 200 also comprises means for transmitting an alarm on the vehicle such as one or more loudspeakers 218, which can be the loudspeakers of the vehicle, and one or more display screens 220, which can be a display screen of the on-board computer of the vehicle.

Figure 3:
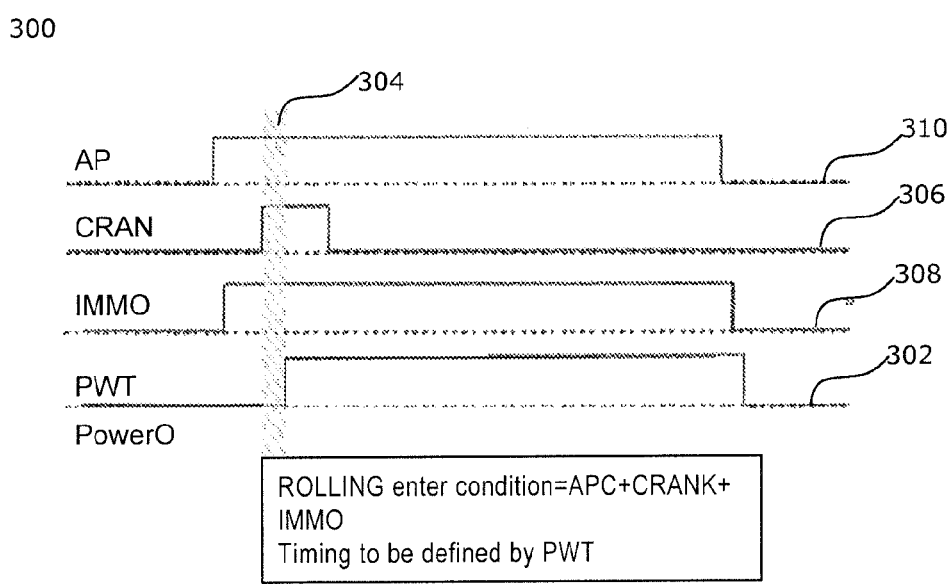
FIG. 3 is a diagrammatic representation of the signals involved during the starting of a vehicle utilized in the method and system according to the invention.

The different signals involved in the starting of a vehicle available for rental according to the invention will now be described with reference to FIG. 3.

Starting, represented by the PWT signal 302, can be carried out only if, during a measurement period, the greyed period 304, the signals involved in starting the vehicle all have a predetermined value, which here is a positive value.

The 'Cran' signal represented by the line 306 corresponds to the start signal sent by the ignition key when the user requests starting.

The 'Immo' signal represented by the line 308 corresponds to that generated by an ESA item data, i.e. a user's right to start the engine. This item of data is communicated by the central site after the user has been identified and his rights validated.

The 'AP' signal represented by the line 310 is generated by another element of the vehicle, or a control unit that verifies that all the elements of the vehicle are in a satisfactory state such as, for example, the doors are properly open or closed, the battery is disconnected, or the charging lid is closed, etc.

Thus, if the ESA item of data has a predetermined value, the IMMO signal value is negative and the vehicle cannot start.

Figure 4:
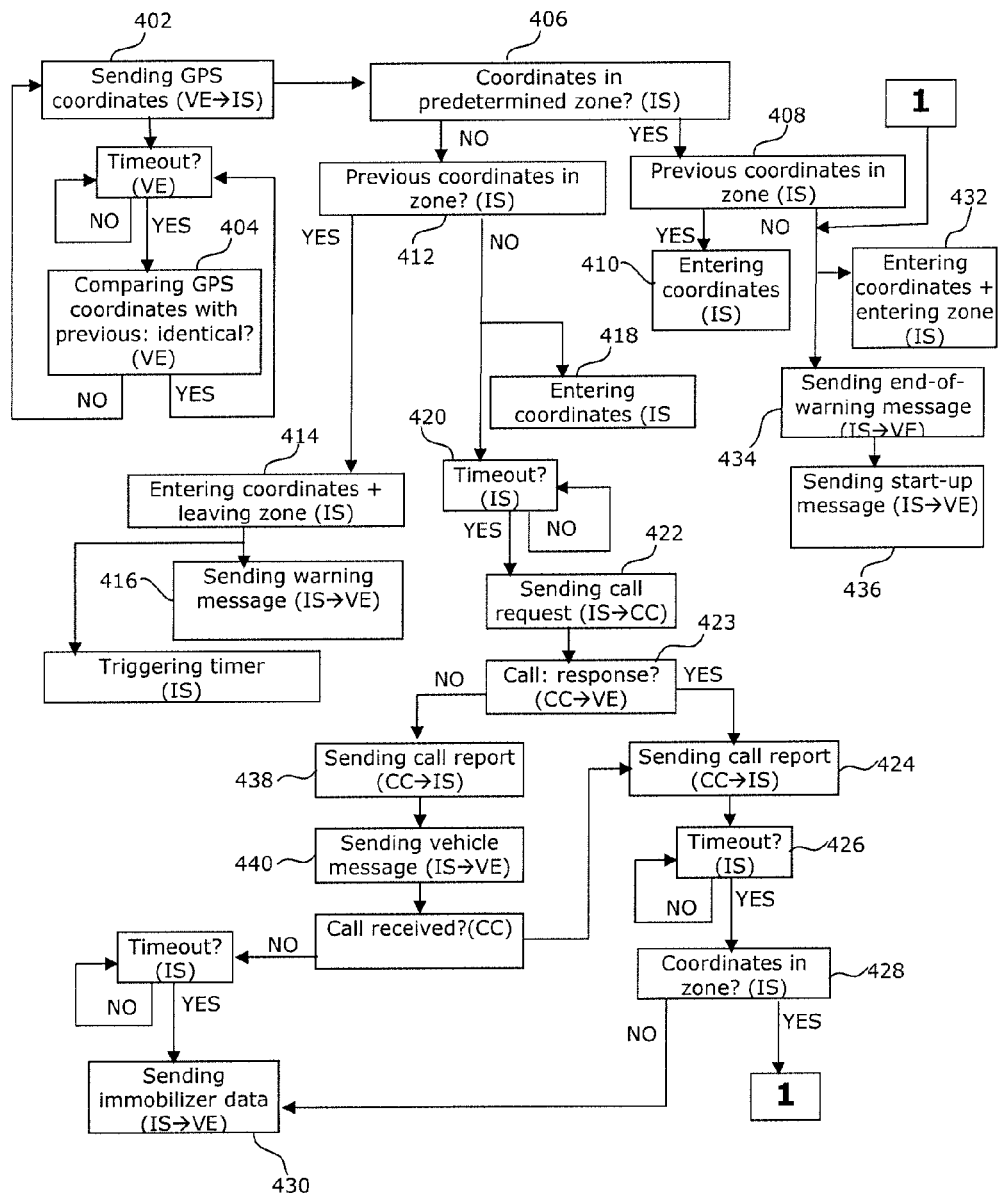
FIG. 4 is a diagrammatic representation of an example of a method according to the invention.

A non-limitative example of a method according to the invention will now be described with reference to FIG. 4.

The method 400 comprises a step 402 of sending the current global positioning (or GPS) data of the vehicle to the central site. This sending of GPS coordinates is carried out by the control module and/or the communication module described above.

This sending of coordinates is carried out periodically when the vehicle is moving. Thus, once the coordinates have been sent, the vehicle waits for a predetermined period (for example 10 s) and again retrieves the GPS coordinates of the vehicle. It compares them with the previous coordinates, in a step 404, and if they are the same, it again waits for a predetermined period.

If they are not the same as the previous coordinates, it again sends them to the central site in a repeat of step 402.

As a variant, it could be envisaged that the system comprise means of examining the state of the vehicle, for example by means of a link to a CAN bus of the vehicle. In this case, the GPS coordinates of the vehicle would be sent if and only if the engine were found to be running or the wheels turning. The coordinates can also be sent when it is the first time that the means find that the vehicle has stopped.

The steps described below are carried out, non-limitatively and by way of a particular example, by the central site. At least some of these steps can also be carried out in the vehicle in another example that would not exceed the scope the present invention. In this case, the steps are carried out in the same way as described hereafter but the result (outside the zone or in the zone) is communicated to the central site, with or without the GPS coordinates of the vehicle in addition.

After receiving the GPS data, in a test step 406, the central site verifies whether the GPS coordinates are situated in a predetermined zone. This zone is modelled in the form of GPS coordinates in a central site database. The central site verifies for example a first coordinate sent by the vehicle to verify that this coordinate (latitude for example) is situated in a first range of coordinates. If this is the case, a range of second coordinates (longitude for example) correspond to the extent of the zone in terms of longitude for the latitude at which the vehicle is situated. If the vehicle is situated in this range, it is considered to be situated in the zone. If this is not the case, it is considered to be situated outside the zone.

If it is found that the vehicle is situated in the predetermined zone, the central site verifies whether the previous coordinates of the vehicle were already in the zone in a step 408. If this is the case, in a step 410, the central site enters the coordinates of the vehicle in a database so that these data are associated with the identifier of the vehicle and/or the identifier of the user of the vehicle. The process is then on stand-by until the next coordinates are received from the vehicle.

If this is not the case, another series of steps 432 to 436 takes place, which will be described below.

In the event that the vehicle is not situated in the predetermined zone, the central site verifies whether the previous coordinates of the vehicle were already situated outside the zone in a step 412. This verification can be carried out by the verification of a specific field, indicating for example the state of leaving the zone of the vehicle (in the zone or outside the zone).

If the previous coordinates were not situated outside the zone, the current coordinates are entered in a database and the value of the specific field relating to the leaving of the zone mentioned above in a step 414. In a step 416, a warning message is sent to the vehicle so that the message is displayed on the on-board computer's screen. Such a message could be "Warning, you are leaving the authorized zone. Please return to the authorized zone". This message remains displayed on the screen unless otherwise directed by the central agency.

This first leaving of the zone also triggers the starting of a timer, for example of 15 minutes.

If these are not the first coordinates notifying the leaving of the authorized zone and the previous coordinates were therefore also situated outside the zone, during a step, the central site enters the coordinates in a database in this step and in a step 420 verifies whether the timer (the 15-minute period for example) has timed out. If this is not the case, it switches to stand-by, but if this is the case, the central site asks a call centre to issue a call to the vehicle in a step 422. The on-board computer of the vehicle comprises a GSM card that makes it possible to communicate with a remote telephone over the GPRS network.

It will be noted that this step can also be carried out if the distance of the vehicle from the zone is greater than a predetermined distance or if one of the abovementioned time or distance criteria is met.

The call centre comprises software managing the priorities of the operators. In this software, the call request is classified as urgent and is therefore dealt with by the first operator to have finished dealing with his current task, unless there are other tasks having the same degree of urgency as this one, in which case it is placed in the queue of urgent tasks.

A call centre operator calls the vehicle in a step 423. Once a call has been made a report is sent to the central site, in a step 424, indicating whether the driver of the vehicle responded to the call and, if appropriate, the measures to be taken depending on the content of the conversation.

If the driver responded to the call centre, the measure generally taken is that he is allowed a predetermined period to return to the predetermined zone in a step 426. This period can be determined automatically or manually by a call centre operator depending on what he has found out from his conversation with the user.

Once the predetermined period, counted down by the central site, has passed, the central site verifies whether the new GPS coordinates or item of data relating to the vehicle leaving the zone are outside the zone in a step 428. This verification can be based on the last GPS coordinates received from the vehicle or on coordinates expressly requested by the central site.

If it is found that the coordinates are still outside the zone after the predetermined period, the central site sends a message to the vehicle containing an item of data actuating the immobilizer of the vehicle in a step 430.

The receipt of certain data by the unit is capable of triggering the activation of a control signal as described above with reference to FIG. 3. Generally, one of these data is an item of data named "ESA" which activates a signal the characteristic of which makes it possible, in combination with other signals, to activate the starting of the powertrain. This item of data is stored by the vehicle. Thus, when the vehicle is stopped, it is no longer possible to restart it, which makes it possible to prevent the vehicle from travelling a greater distance away from the zone.

If, after the predetermined period, the vehicle has returned to the zone, the following steps are carried out.

In a step 432, the new coordinates of the vehicle are entered and, in the database, in the field indicated for this purpose, it is indicated that the vehicle has returned to the zone, for example by modifying a binary value of the "out_of_zone" type.

In a step 434, an end-of-warning message is sent to the vehicle, in particular to its on-board computer, to generate the "end-of-warning" for the user. A message can even indicate to the user that he has returned to the zone.

A message can be sent to the vehicle with an ESA item of data displaying a value authorizing starting in a step 436. This last message could also be sent only if necessary, for example if the current ESA item of data of the vehicle does not authorize starting.

The abovementioned steps 432-436 are also carried out when the vehicle re-enters the zone namely when the GPS coordinates are determined as being in the zone but the previous coordinates were not determined to be in the zone, without the call procedure having been triggered.

If no response to the call made by the centre in step 423 has been received, the coordinates are entered in a step 438. In a step 440, the central site sends a message to the vehicle, to be displayed on the on-board computer of the vehicle asking the driver of the vehicle to call the call centre on a given number within a predetermined period (for example, 5 minutes).

The call centre (or the central site) then counts down this predetermined period. If before the end of this period, a call has been received, the method is returned to step 424, of sending the report of the call by the call centre operator. Otherwise, the immobilizing data, as described above, are sent to the vehicle by the central site in step 430.

The method according to the invention is not limited to what has been described above. It would be possible to imagine a large number of variants.

For example, the immobilizing item of data could be sent to the vehicle only if, when the latter stops, it is verified that the coordinates of the vehicle are outside the zone.

It is also possible to envisage that, when the vehicle leaves the zone or when it is sent the immobilizing data, in conjunction therewith the central site sends an SMS to the presumed user of the vehicle having obtained his telephone number from a client database and from a database linking the identifier of the user to the identifier of the vehicle.

This SMS can allow the user:
  in the event of theft: to realise that the vehicle has been stolen if he was not yet aware of this. He can then call the call centre. This can trigger the sending of immobilizing data to the vehicle without delay and the sending of an SMS to the law enforcement agencies in order for them to recover the vehicle; or
  to indicate to a call centre that he is in fact the individual at the wheel of the vehicle, for example by giving the operator a password contained in the SMS. This can allow the immobilizer of the vehicle to be turned off, by sending data from the central site.

When the vehicle leaves the predetermined zone, at least for a period greater than the predetermined period or at a distance greater than the predetermined distance, the central site can enter this in a database relating to invoicing, which will give rise to an additional cost for the client. The data entered in the database can comprise the time at which the zone is left or the period/critical distance is exceeded, the time at which the zone is re-entered, etc.

The coordinates of the zone could also be stored in the vehicle and verified locally.

The vehicle can also transmit the course of the vehicle to the central site. If the central site determines, when the vehicle is outside the zone, that the latter is heading back towards the zone, certain actions may not be carried out, such as for example the sending of immobilizing data.

Of course, the sequence of the different signalling steps can be completely different from that which has been described. For example, any signalling described above can be triggered as soon as the vehicle leaves the predetermined rental zone, or exceeds a period or a predetermined distance outside the zone.

Of course the invention is not limited to the examples which have just been described.

What is claimed is:

1. A method for monitoring a vehicle available for rental, said vehicle comprising a global positioning navigation device arranged to determine and notify the location coordinates of said vehicle, said method comprising the following steps:
storing a first identifier in the vehicle, wherein the first identifier is associated with an authorized user of the vehicle;
determining that the location coordinates of said vehicle are not situated in a previously registered predetermined zone;
in response to determining the location coordinates are not situated in the predetermined zone, collecting, by an identification module disposed in the vehicle, a second identifier, wherein the second identifier is associated with a person in the vehicle;
comparing the first identifier with the second identifier;
determining whether the first identifier matches the second identifier; and
in response to determining the first identifier does not match the second identifier, notifying a central site over a GPRS network.

2. The method according to claim 1, wherein the determining step is carried out only if the vehicle is moving.

3. The method according to claim 1, further comprising verifying data relating to the course or destination of the vehicle.

4. The method according to claim 1, further comprising transmitting the location coordinates to the central site, the result of the determining step to the central site, or a combination thereof.

5. The method according to claim 1, wherein the collecting step is initiated by the central site.

6. The method according to claim 1, further comprising:
in response to determining the location coordinates are not situated in the predetermined zone, displaying a warning on a user interface of the vehicle.

7. The method according to claim 1, further comprising, before the collecting step, determining at least one of the conditions listed below:
a course or destination of the vehicle,
a distance away from the zone,
a period since leaving the zone, or
a response to a telephone call or message originating from the central site.

8. The method according to claim 1, further comprising sending, from the central site to the vehicle, an item of data relating to the starting of the vehicle, the item of data capable of preventing the starting of the vehicle.

9. The method of claim 1 wherein the first identifier is a first biometric identifier or a first RFID identifier and the second identifier is a second biometric identifier or a second RFID identifier.

10. A method for monitoring a vehicle, the method comprising:
determining an authorized zone, wherein the authorized zone is associated with the vehicle;
storing a first identifier in the vehicle, wherein the first identifier is associated with an authorized user of the vehicle;
determining a location of the vehicle;
determining whether the location is outside the authorized zone;
in response to determining the location coordinates are outside the authorized zone, collecting a second identifier, wherein the second identifier is associated with a person in the vehicle;
determining whether the first identifier matches the second identifier; and
in response to determining the first identifier does not match the second identifier, sending a notification to a central site.

11. The method of claim 10 wherein the first identifier is a first biometric identifier or a first RFID identifier and the second identifier is a second biometric identifier or a second RFID identifier.

12. The method of claim 10 wherein the notification includes the location.

13. The method of claim 10 further comprising:
receiving the notification at the central site; and
in response to receiving the notification at the central site, transmitting a telephone call to the vehicle from the central site.

14. The method of claim 10 further comprising:
receiving the notification at the central site; and
in response to receiving the notification at the central site, immobilizing the vehicle.

15. The method of claim 10 further comprising:
receiving the notification at the central site; and
in response to receiving the notification at the central site, transmitting an alert to the vehicle.

16. The method of claim 10 further comprising:
receiving the notification at the central site; and
in response to receiving the notification at the central site, notifying a law enforcement agency.

17. The method according to claim 1 further comprising:
if the location coordinates are not situated in the predetermined zone, executing an anomaly signalling step, wherein the anomaly signalling step comprises transmitting a telephone call to the vehicle, over the GPRS network.

18. A system for monitoring a vehicle associated with a central site relative to an authorized zone of the vehicle, the system comprising:
a first identifier stored in the vehicle, wherein the first identifier is associated with an authorized user of the vehicle;
a global positioning navigation device configured to determine location coordinates of the vehicle;
an analysis module configured to determine whether the location coordinates are outside the authorized zone;
an identification module configured to collect a second identifier associated with a person in the vehicle in response to determining the location coordinates are outside the authorized zone;

a control module configured to determine whether the first identifier matches the second identifier; and a communication module configured to communicate a notification to the central site in response to determining the first identifier does not match the second identifier.

19. The system of claim 18, wherein the first identifier is a first biometric identifier or a first RFID identifier and the second identifier is a second biometric identifier or a second RFID identifier.

20. The system of claim 18, wherein the notification includes the location coordinates.

21. The system of claim 18, wherein the central site is configured to transmit a telephone call to the vehicle in response to receiving the notification.

22. The system of claim 18, wherein the central site is configured to immobilize the vehicle in response to receiving the notification.

23. The system of claim 18, wherein the central site is configured to transmit an alert to the vehicle in response to receiving the notification.

24. The system of claim 18, wherein the central site is configured to notify a law enforcement agency in response to receiving the notification.

* * * * *